(12) United States Patent
Ogasawara

(10) Patent No.: US 8,135,515 B2
(45) Date of Patent: Mar. 13, 2012

(54) ELECTRONIC CONTROL APPARATUS AND METHOD FOR A STEERING SYSTEM

(75) Inventor: Terumoto Ogasawara, Gamagori (JP)

(73) Assignee: Denso Corporation, Kariya (JP)

( * ) Notice: Subject to any disclaimer, the term of this patent is extended or adjusted under 35 U.S.C. 154(b) by 476 days.

(21) Appl. No.: 12/480,964

(22) Filed: Jun. 9, 2009

(65) Prior Publication Data

US 2009/0306855 A1    Dec. 10, 2009

(30) Foreign Application Priority Data

Jun. 10, 2008  (JP) ................... 2008-151336

(51) Int. Cl.
 *G06F 17/00* (2006.01)
(52) U.S. Cl. ............ 701/42; 701/41; 180/410; 180/443; 180/446
(58) Field of Classification Search .................... 701/41, 701/42, 43; 180/410, 442, 443
See application file for complete search history.

(56) References Cited

U.S. PATENT DOCUMENTS

| | | | |
|---|---|---|---|
| 5,202,830 A | 4/1993 | Tsurumiya et al. | |
| 6,904,346 B2 * | 6/2005 | Higashi et al. | 701/41 |
| 7,885,742 B2 * | 2/2011 | Yamazaki | 701/41 |
| 2005/0016788 A1 | 1/2005 | Hidaka | |

FOREIGN PATENT DOCUMENTS

| | | |
|---|---|---|
| JP | 2-249762 | 10/1990 |
| JP | 03-286340 | 12/1991 |
| JP | 06-298105 | 10/1994 |
| JP | 2001-260923 | 9/2001 |
| JP | 2001-287606 | 10/2001 |
| JP | 2004-058747 | 2/2004 |
| JP | 2005-032261 | 2/2005 |

OTHER PUBLICATIONS

Japanese Office Action dated Apr. 27, 2010, issued in corresponding Japanese Application No. 2008-151336, with English translation.

* cited by examiner

*Primary Examiner* — Gertrude Arthur Jeanglaude
(74) *Attorney, Agent, or Firm* — Nixon & Vanderhye PC

(57) ABSTRACT

An electronic control apparatus has a microcomputer including a first CPU and a second CPU configured to perform calculation processing and control processing for a vehicle control device such as a variable gear ratio steering device. The first CPU and the second CPU calculate temporary detection values of an operation amount of an actuator based on a detection signal of a sensor, respectively. The temporary detection values are compared to determine whether the vehicle control device is controllable based on the detection signal of the sensor. Thus, the electronic control apparatus is reduced in size, and calculation results are monitored each other within one microcomputer.

10 Claims, 11 Drawing Sheets

ELECTRONIC CONTROL APPARATUS AND METHOD FOR A STEERING SYSTEM

CROSS REFERENCE TO RELATED APPLICATION

This application is based on and incorporates herein by reference Japanese Patent Application No. 2008-151336 filed on Jun. 10, 2008.

FIELD OF THE INVENTION

The present invention relates to an electronic control apparatus and a method for an electronic steering system, which has a variable gear ratio steering device for variably controlling a ratio of transfer of steering angle between a steering wheel and steered wheels of a vehicle.

BACKGROUND OF THE INVENTION

US 2005/0016788 discloses a variable gear ratio steering device (VGRS), which varies a transfer ratio of steering angle between a steering wheel and steered wheels of a vehicle by the use of an electric motor as an actuator. The motor is electronically controlled by an electronic control unit for VGRS (VGRS-ECU).

This VGRS-ECU is operatively connected to the actuator, which includes, for example, the electric motor for generating torque and a reduction device for transferring reduced rotation. The VGRS-ECU receives a detection signal of a sensor, which detects operation of the actuator, calculates a detection value of operation of the actuator based on the detection signal, and controls the actuator of the VGRS based on the calculated detection value. The operation amount of the actuator is calculated by multiplying the rotation angle of a rotor of the motor by a gear ratio of the reduction device, and corresponds to the operation angle of the actuator.

The detection value of the actuator operation amount is therefore one of parameters to be used to control the VGRS, and hence is required to be highly accurate.

As one exemplary related art, as shown in FIG. 12A, a VGRS-ECU 100 may be configured to have two (first and second) microcomputers 101 and 102 on a substrate. The first and second microcomputers 101 and 102 are configured to calculate detection values of actuator operation amount, respectively, and compare the two calculated detection values thereby to enhance the reliability of the calculated detection values.

Specifically, as shown in FIG. 12B, the first and second microcomputers 101 and 102 have first and second CPUs, first and second input circuits, random access memories (RAMs), read-only memories (ROMs), output circuits and the like, respectively.

As shown in FIG. 13 in more detail, the first and second microcomputers 101 and 102 have first and second detection value calculation programs in the ROMs for calculating first and second detection values of the actuator operation amount, respectively. The first and the second programs are the same.

The first microcomputer 101 receives a detection signal from a sensor through the first input circuit and acquires a first initial value y1 corresponding to the detection signal to calculate a first detection value Y1 by the first CPU based on the first detection value calculation program. In this connection, the first CPU executes S101 and S102 shown in FIG. 14.

The second microcomputer 102 receives the detection signal from the sensor through the second input circuit and acquires a second initial value y2 corresponding to the detection signal to calculate a second detection value Y2 by the second CPU based on the second detection value calculation program. In this connection, the second CPU executes S201 and S202 shown in FIG. 14.

The first and second detection values Y1 and Y2 calculated by the first and second CPUs are stored in RAMs of the first and second microcomputers 101 and 102, respectively. In this connection, the first and second CPUs execute S103 and S203 shown in FIG. 14, respectively. The first microcomputer 101 stores a comparison program in its ROM to compare the first and second detection values Y1 and Y2. The second microcomputer 102 transmits the second detection value Y2 to the first microcomputer 101. The first microcomputer 101 executes the comparison operation by using the first and second detection values Y1 and Y2 based on the comparison program. In this connection, the first CPU executes S104 shown in FIG. 14.

If it is determined that there is no significant difference between the first and second detection values Y1 and Y2 (S104: YES), that is, the first and second values are the same or in a predetermined relation, the control for VGRS is continued by using either one of the detection values Y1 and Y2 at S105 shown in FIG. 14. If it is determined that there is a significant difference between the first and second detection values Y1 and Y2 (S104: NO), the control for VGRS is stopped and a predetermined operation such as a fail-safe operation or an open-loop control is executed irrespective of the detection signal of the sensor at S106 shown in FIG. 14.

As described above, the VGRS-ECU 100 is provided with the first and second microcomputers 101 and 102 to improve the reliability of the detection value of the actuator operation amount.

The VGRS-ECU 100 needs, in addition to the two microcomputers 101 and 102, various electronic components such as MOSFETs, capacitors, resistors and the like. These electronic components are also mounted on a substrate and occupies a large amount of space in the VGRS-ECU 100. Since the number of ECUs in the vehicle recently exceeds 100 units, the VGRS-ECU 100 itself is required to be reduced in size. In an instrument panel of the vehicle, a number of devices such as an air-conditioner, meters, audios and the like are mounted at present, and the number will further increase in the future. Therefore, if the VGRS-ECU 100 is mounted in the instrument panel of the vehicle, it must be further reduced in size.

Further, the first and second microcomputers 101 and 102 need be connected by a communication line CL to transfer the detection values Y1 and Y2 between the first and second microcomputers 101 and 102 for the comparison operation in the first microcomputer 101. The communication line CL is susceptible to external noise. Therefore it is required to reconfigure the VGRS-ECU 100 so that the detection values Y1 and Y2 may be monitored each other without transfer of the calculation result.

SUMMARY OF THE INVENTION

It is therefore an object of the present invention to reduce a VGRS-ECU in size to improve mountability in a limited space and enhance reliability of detection values of actuator operation amount without transfer of calculation result in an outside of a microcomputer.

According to one aspect of the present invention, an electronic control apparatus and method comprises a substrate and a microcomputer mounted on the substrate with other electronic circuit elements. The microcomputer includes a first CPU and a second CPU configured to perform calculation processing and control processing for a vehicle control device such as a variable gear ratio steering device.

Preferably, the first CPU and the second CPU are configured to calculate temporary detection values of an operation amount of an actuator based on a detection signal of a sensor; respectively. The temporary detection values calculated by the first CPU and the second CPU are compared to determine whether the variable gear ratio steering device is controllable based on the detection signal of the sensor.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EMBODIMENT

Figure 1:
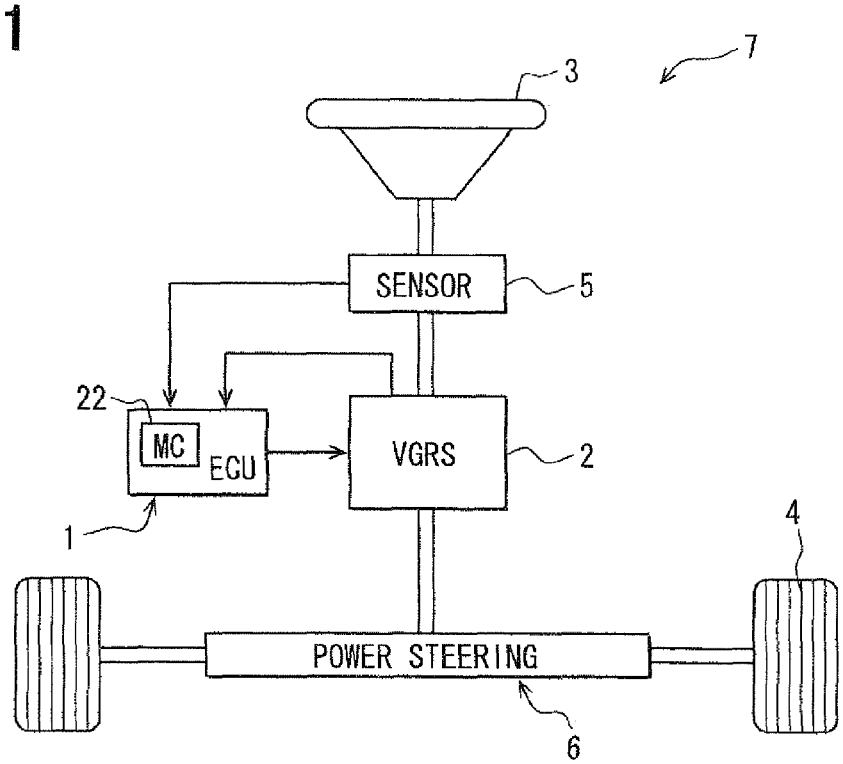
FIG. 1 is a schematic diagram showing an electronic steering system for a vehicle according to an embodiment of the present invention.

Referring to FIG. 1, an electronic control apparatus for a variable gear ratio steering system (VGRS-ECU) 1 is provided to electronically control a variable gear ratio steering device (VGRS) 2. The VGRS 2 is for variably controlling a transfer ratio (steering ratio) between a steering angle of a steering wheel 3 in a vehicle compartment and steered angle of steered wheels (tire wheels) 4 of the vehicle. The VGRS 2 is a part of a steering system 7 with a steering angle sensor 5, a power steering device 6 and the like. The steering angle sensor 5 is for detecting a steering angle of the steering wheel 3 operated by a driver. The power steering device 6 is for power-assisting the steered wheels 4.

Figure 2:
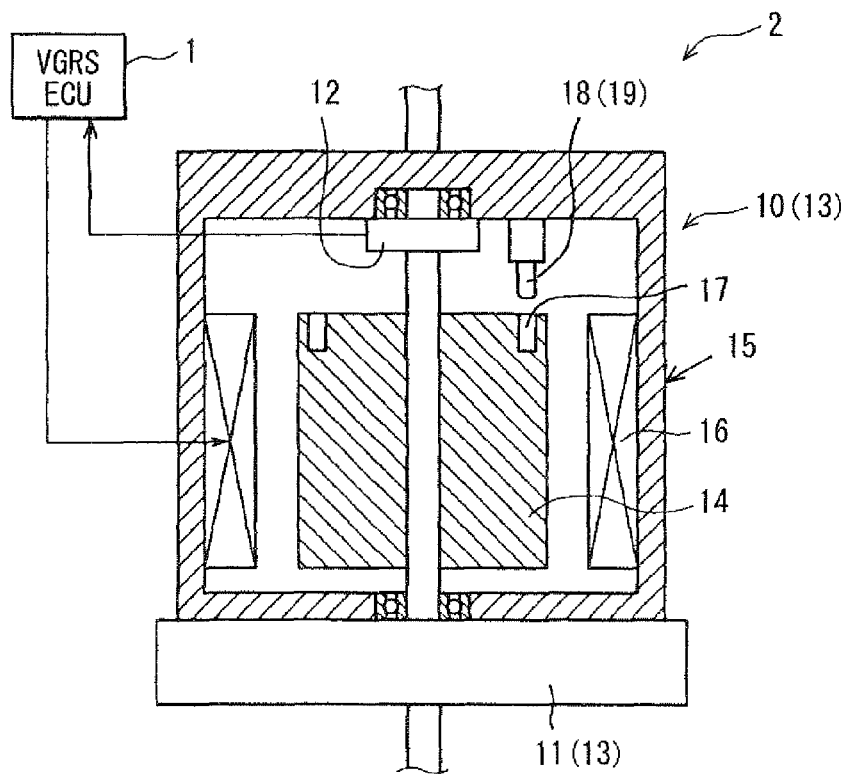
FIG. 2 is a sectional view of a VGRS used in the embodiment.

The VGRS 2 includes, as shown in FIG. 2, an electric motor 2, a reduction device 11 and a rotation angle sensor 12. The electric motor 10 is for generating torque for varying the steering ratio. The reduction device 11 is for reducing the torque of the electric motor 10. The rotation angle sensor 12 is for detecting a rotation angle of the electric motor 10. The electric motor 10 and the reduction device 11 form an actuator.

The electric motor 10 is, for example, a magnet synchronous motor having permanent magnets embedded in a rotor 14 and a plurality of armature coils 16 in a stator 15 arranged in an outer periphery of the rotor 14. The rotor 14 rotates to generate torque when current supply to the armature coils 16 is controlled by an inverter (not shown).

A solenoid device 19 is assembled to the stator 15 to stop the rotation of the rotor 14 by fitting a pin 18 into a hole 17 formed in the rotor 14, when the VGRS 2 need not be controlled. The reduction device 11 is, for example, a conventional planetary gear reduction device. The rotation angle sensor 12 is, for example, a conventional encoder, which detects the rotation angle of the rotor 14.

Figure 3A:
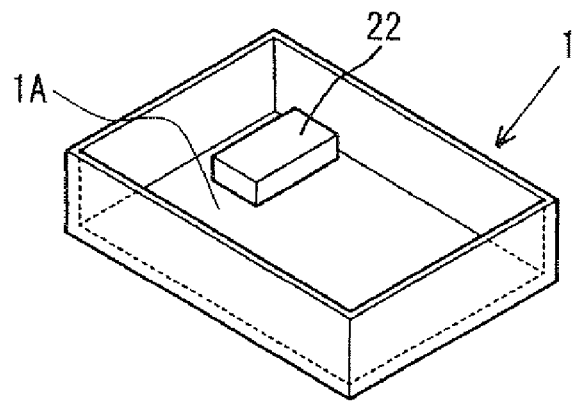
FIGS. 3A and 3B are a schematic view showing an VGRS-ECU for the VGRS and a block diagram of a microcomputer, which are used in the embodiment, respectively.

As shown in FIG. 3A, the VGRS-ECU 1 has one microcomputer 22 and other various electronic components such as MOSFETs (not shown), resistors (not shown) and the like mounted on a substrate 1A (indicated as a bottom of the VGRS-ECU 1). The microcomputer 22 is for performing calculation and control processing operation based on various data and stored programs. The MOSFETs are for turning on and off the current supply to the armature coils 16. The resistors are for detecting currents flowing in respective phases of the armature coils 16.

The VGRS-ECU 1 is configured to electronically control the VGRS 2 by performing control of current supply to the armature coils 16 based on various detection values produced by the steering angle sensor 5, the rotation angle sensor 12 and the like.

The VGRS-ECU 1 is configured to calculate a detection value of actuator operation angle, which is essential in controlling the VGRS2, based on a detection signal produced from the rotation angle sensor 12 in the form of an electronic signal. The VGRS-ECU 1 is further configured to control the VGRS 2 by using the calculated detection value of the actuator operation angle. The actuator operation angle is one parameter of various operation amounts of the actuator. If the electric motor 10 is assumed to be an actuator, the actuator operation angle is determined by multiplying the rotation angle of the rotor 14 by a gear ratio of the reduction device 11.

The microcomputer 22 is configured as described below to calculate the detection value of the actuator operation angle based on the detection signal of the rotation angle sensor 12.

Figure 3B:
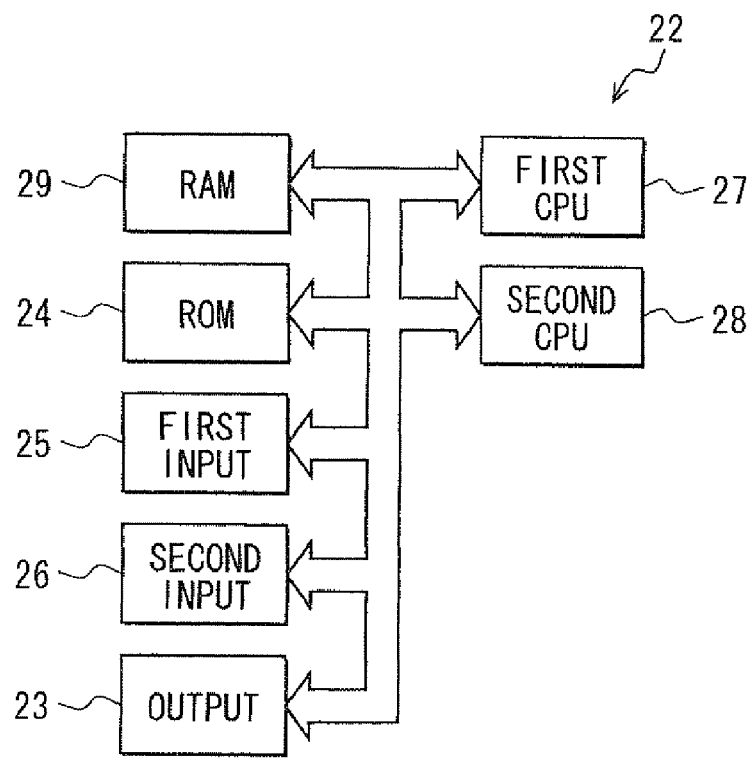
Figure 4:
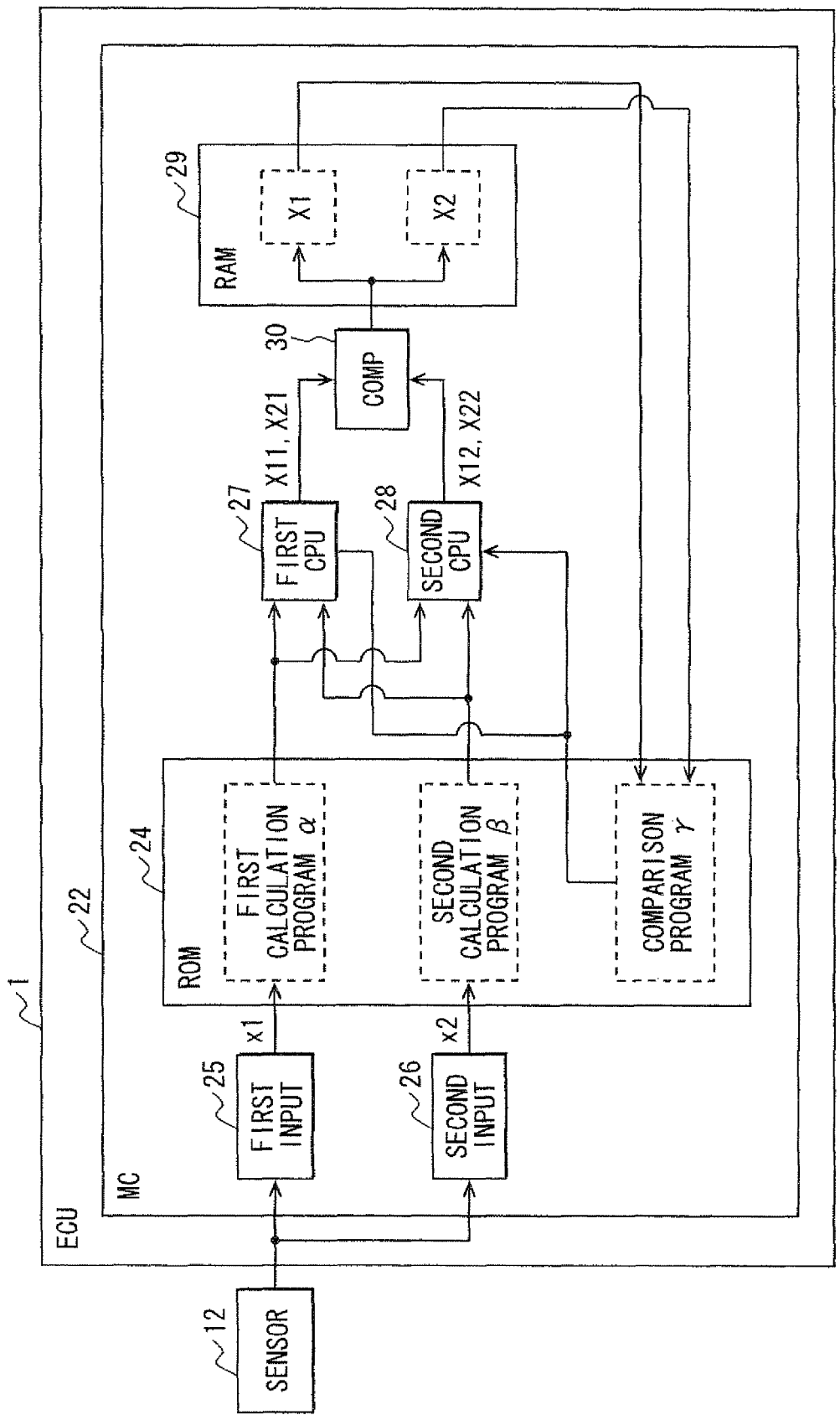
FIG. 4 is a block diagram showing a part of the microcomputer for calculating operation of detection values of an actuator operation angle performed in the embodiment.

Specifically, as shown in FIG. 3B and FIG. 4, the microcomputer 22 has an output circuit 23, one read-only memory (ROM) 24, two (first and second) input circuits 25 and 26, two (first and second) central processing units (CPUs) 27 and 28, one random access memory (RAM) 29, a comparator 30, and the like. The ROM 24 stores therein various programs for calculating the detection value of the actuator operation angle. The first and second input circuits 25 and 26 receive the same detection signal from the rotation angle sensor 12. The first and second CPUs 27 and 28 calculate detection values of the actuator operation angle by executing the stored programs. The RAM 29 temporarily stores therein the detection values calculated by the first and second CPUs 27 and 28. The comparator 30 compares the detection values (calculation result) of the first and second CPUs 27 and 28.

The ROM 24 stores therein two (first and second) detection value calculation programs (α and β), which define the same or similar processing so that the two calculation results become the same or similar The ROM 24 further stores therein a comparison program (γ), which defines comparison of a first detection value X1 and a second detection value X2. These detection values X1 and X2 are calculated by the first detection value calculation program α (alpha) and the second value calculation program β (beta), respectively.

The first input circuit 25 receives the detection signal of the rotation angle sensor 12 and produces a first initial value x1, which is used by the first and second CPUs 27 and 28 in the calculation processing of the first detection value calculation program α. The second input circuit 26 also receives the same detection signal of the rotation angle sensor 12 and produces a second initial value x2, which is used by the first and second CPUs 27 and 28 in the calculation processing of the second detection value calculation program β. The detection signal of the rotation angle sensor 12 is applied to the first and second input circuits 25 and 26 at the same time point. The initial values x1 and x2 correspond to the detection signal thus applied to the first and second input circuits 25 and 26.

The first and second CPUs 27 and 28 are configured as LSIs of the same processing capability. The first CPU 27 includes an arithmetic unit (not shown) for arithmetic processing and logic processing of data, registers for temporary storage of data and a controller (not shown) for controlling operation of decoding program instructions and the like. The registers are shown outside the first and second CPUs 27 and 28 as designated with numerals 33 and 34 in FIGS. 5 to 7, although they are provided inside the first and second CPUs 27 and 28 in practice, respectively.

Referring to FIG. 4, both the first and second CPUs 27 and 28 read out the first detection value calculation program a from the ROM 24 and calculate the first detection values X1 based on the first initial value x1 produced by the first input circuit 25 by performing the same first detection value calculation program α, respectively.

Here it is assumed that the first detection value X1 calculated by the first CPU 27 based on the first initial value x1 by executing the first detection value calculation program a is a temporary first detection value X11. It is also assumed that the first detection value X1 calculated by the second CPU 28 based on the first initial value x1 by executing the first detection value calculation program a is a temporary first detection value X12. These two temporary first detection values X11 and X12 are compared by the comparator 30. If the two detection values X11 and X12 are equal and have no significant difference, either one of the two detection values X11 and X12 is stored in the RAM 29 as the first detection value X1.

Figure 5:
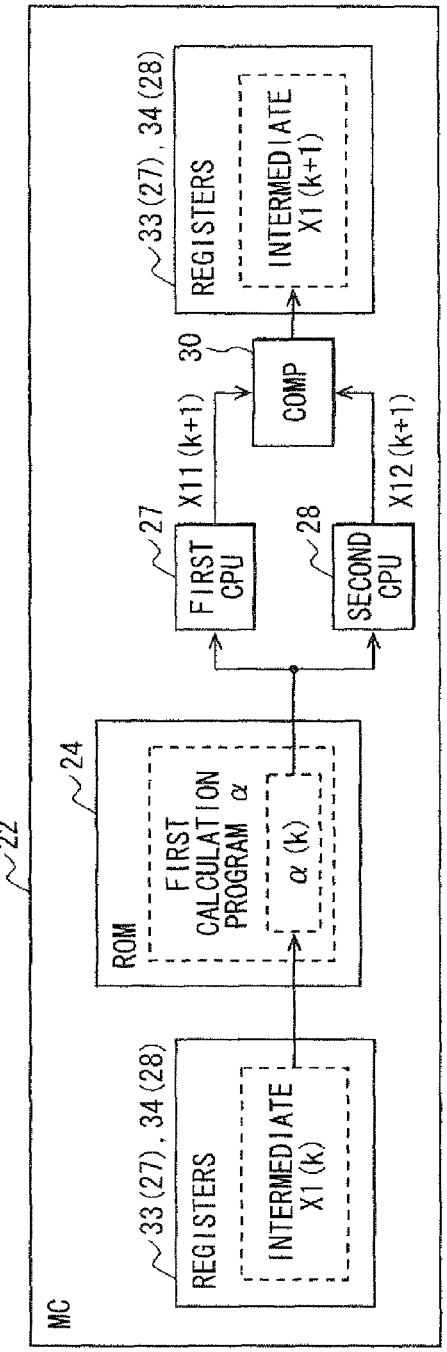
FIG. 5 is a block diagram showing a part of the microcomputer for calculating operation of a first detection value performed in the embodiment.

As shown in FIG. 5, each of the first and second CPUs 27 and 28 successively executes a plurality of processing α(k) forming a part of the first detection value calculation program α in performing the first detection value calculation program α, and successively calculates an intermediate calculation values X1($k$+1). Here, (k) is an integer including 1, 2, . . . , L. Further X1(1)=x1, X11(L+1)=X11, X12(L+1)=X12, and X1(L+1)=X1.

Specifically, in executing the first detection value calculation program α, each of the first and second CPUs 27 and 28 calculates a present intermediate calculation value X1($k$+1) by performing processing α(k) while using a preceding intermediate calculation value X1($k$) therein. The intermediate calculation value X1($k$) is stored in the register 33 or 34, and updated to the calculated intermediate calculation value X1($k$+1) after the execution of the processing α(k).

Here, the intermediate calculation value X1($k$+1), which is calculated by the execution of the processing α(k) by using the intermediate calculation value X1($k$) by the first CPU 27 is set to the temporary intermediate calculation value X11($k$+1). The intermediate calculation value X1($k$+1), which is calculated by the execution of the processing α(k) by using the intermediate calculation value X1($k$) by the second CPU 28, is set to the temporary intermediate calculation value X12($k$+1). It is noted that X11(L+1)=X1 and X12(L+1)=X12.

The temporary intermediate calculation values X11($k$+1) and X12($k$+1) are compared by the comparator 30. If these two intermediate calculation values have no significant difference or equal to each other, one of these two intermediate calculation values is selected as the intermediate calculation value X1($k$+1) and the intermediate calculation value X1($k$) is updated to X1($k$+1).

As described above, the first detection value calculation program α is performed by executing the processing α(k) in succession from k=1 to k=L. The intermediate calculation value X1($k$) is successively updated and stored. As a result, the intermediate calculation value is updated from the first initial value x1 corresponding to the intermediate calculation value X1(1) to the first detection value X1 corresponding to the intermediate calculation value X1(L+1). The first detection value X1 is finally stored in the RAM 29 as shown in FIG. 4.

Referring to FIG. 4, both the first and second CPUs 27 and 28 read out the second detection value calculation program from the ROM 24 and calculate the second detection values X2 based on the second initial value x2 produced by the second input circuit 26 by performing the same second detection value calculation program β, respectively.

Here it is assumed that the second detection value X2 calculated by the first CPU 27 based on the second initial value x2 by executing the second detection value calculation program β is a temporary second detection value X21. It is also assumed that the second detection value X2 calculated by the second CPU 28 based on the second initial value x2 by executing the second detection value calculation program β is a temporary second detection value X22. These two temporary second detection values X21 and X22 are compared by the comparator 30. If the two detection values X21 and X22 are equal and have no significant difference, either one of the two detection values X21 and X22 is stored in the RAM 29 as the second detection value X2.

Figure 6:
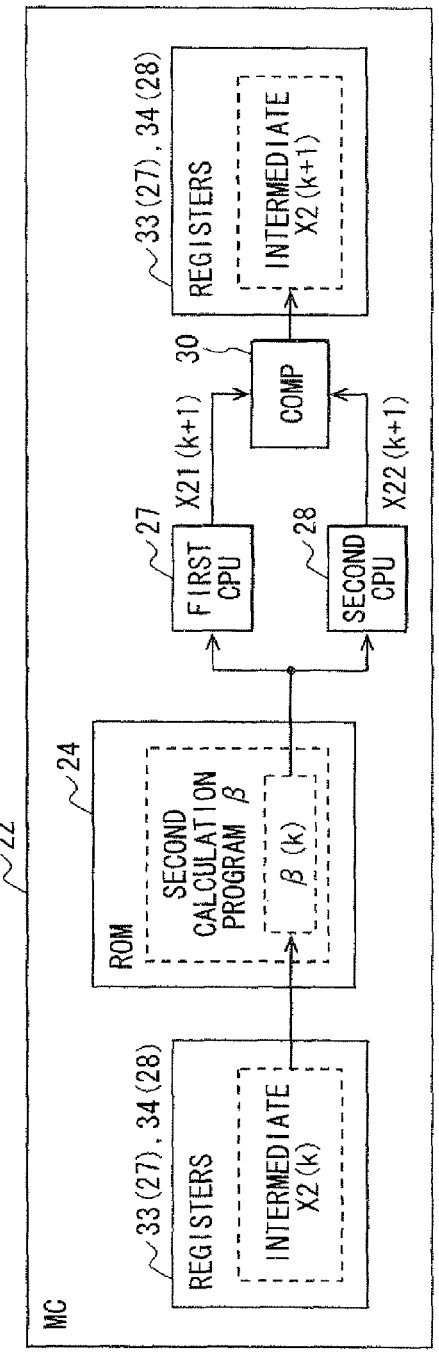
FIG. 6 is a block diagram showing a part of the microcomputer for calculating operation of a second detection value performed in the embodiment.

As shown in FIG. 6, each of the first and second CPUs 27 and 28 successively executes a plurality of processing β(k) forming a part of the second detection value calculation program β in performing the second detection value calculation program β, and successively calculates an intermediate calculation values X2($k$+1). Here, (k) is an integer including 1, 2, . . . , M. Further, X2(1)=X2, X21(M+1)=X21, X22(M+1)=X22, and X2(M+1)=X2.

Specifically, in executing the second detection value calculation program β, each of the first and second CPUs 27 and 28 calculates a present intermediate calculation value X2($k$+1) by performing processing β(k) while using a preceding intermediate calculation value X2($k$) therein. The intermediate calculation value X2($k$) is stored in the register 33 or 34, and updated to the calculated intermediate calculation value X2($k$+1) after the execution of the processing β(k).

Here, the intermediate calculation value X2($k$+1), which is calculated by the execution of the processing β(k) by using the intermediate calculation value X2($k$) by the first CPU 27, is set to the temporary intermediate calculation value X21($k$+1). The intermediate calculation value X2($k$+1), which is calculated by the execution of the processing β(k) by using the intermediate calculation value X2(k) by the second CPU 28, is set to the temporary intermediate calculation value X22(k+1). It is noted that X21(M+1)=X21 and X22(M+1) =X22.

The temporary intermediate calculation values X21(k+1) and X22(k+1) are compared by the comparator 30. If these two intermediate calculation values have no significant difference or equal to each other, one of these two intermediate calculation values is selected as the intermediate calculation value X2(k+1) and the intermediate calculation value X2(k) is updated to X2(k+1).

As described above, the second detection value calculation program β is performed by executing the processing β(k) in succession from k=1 to k=M. The intermediate calculation value X2(k) is successively updated and stored. As a result, the intermediate calculation value is updated from the second initial value x2 corresponding to the intermediate calculation value X2(1) to the second detection value X1 corresponding to the intermediate calculation value X2(L+1). The second detection value X2 is finally stored in the RAM 29 as shown in FIG. 4.

Figure 7:
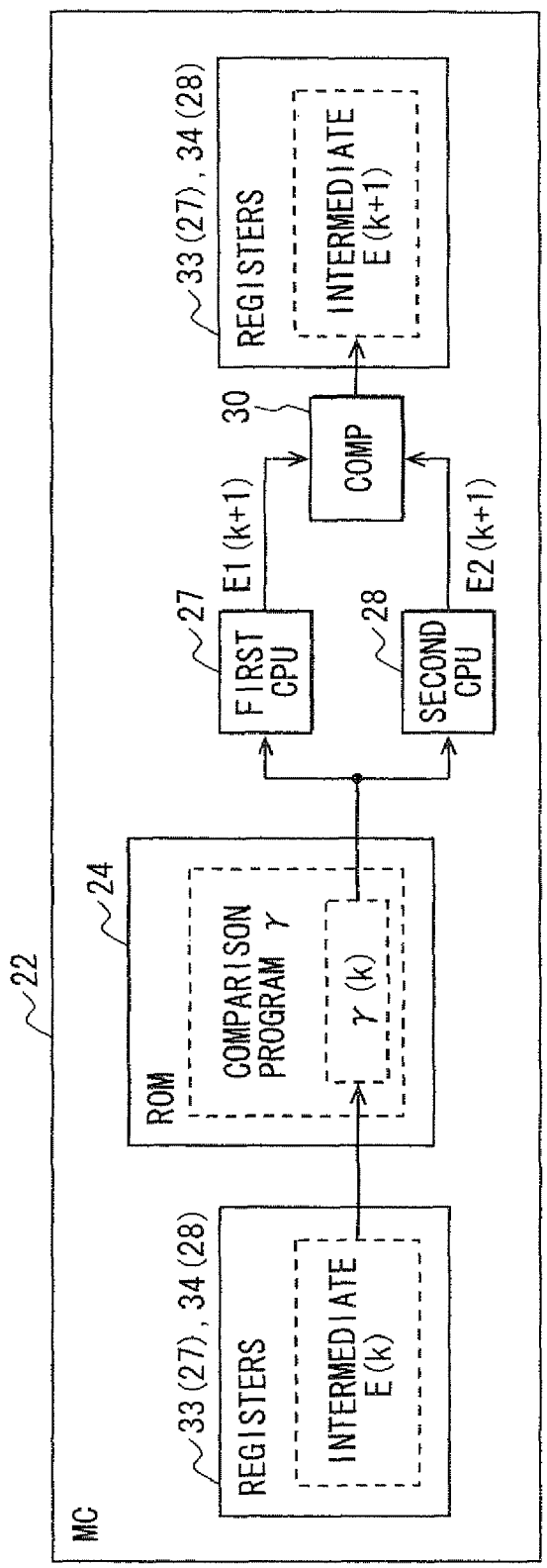
FIG. 7 is a block diagram showing a part of the microcomputer for comparing operation performed in the embodiment.

The first and second CPUs 27 and 28 further read out the comparison program γ from the ROM 24 and execute the comparison program γ by using the second detection values X1 and X2 applied from the RAM 29. As shown in FIG. 7, the first and second CPUs 27 and 28 successively execute a plurality of processing γ(k) of the comparison program γ in performing the comparison program γ and calculate an intermediate calculation value E(k+1). Here, (k) is an integer changing from 1 to N.

Specifically, the first and second CPUs 27 and 28 calculate a present intermediate value E(k+1) by using a previous intermediate calculation value E(k) in executing the processing γ(k) of the comparison program γ. The intermediate calculation value E(k) is stored in the register 33 or 34 and is updated to the present intermediate calculation value E(k+1) after the processing γ(k).

The intermediate calculation value E(k+1), which is calculated by using the intermediate calculation value E(k) in the processing γ(k) by the first CPU 27, is set to a temporary intermediate calculation value E1(k+1). Similarly, the intermediate calculation value E(k+1), which is calculated by using the intermediate calculation value E(k) in the processing γ(k) by the second CPU 28, is set to a temporary intermediate calculation value E2(k+1) These two temporary intermediate calculation values E1(k+1) and E2(k+1) are compared by the comparator 30. If these two values E1(k+1) and E2(k+1) have no significant difference or equal to each other, one of these two values is selected as the intermediate calculation value E(k+1) and the intermediate calculation value E(k) is updated to the intermediated calculation value E(k+1).

As described above, the comparison program γ is performed by successively executing the processing γ(k) from k=1 to k=N. The intermediate calculation value E(k) is updated in succession.

If the first and second detection values X1 and X2 have no significant difference or equal to each other, one of the first and second detection values X1 and X2 is used as the detection value of the actuator operation angle for controlling the VGRS 2.

The operation of the VGRS-ECU 1 according to the embodiment is described with reference to flowcharts shown in FIGS. 8 to 11.

Figure 8:
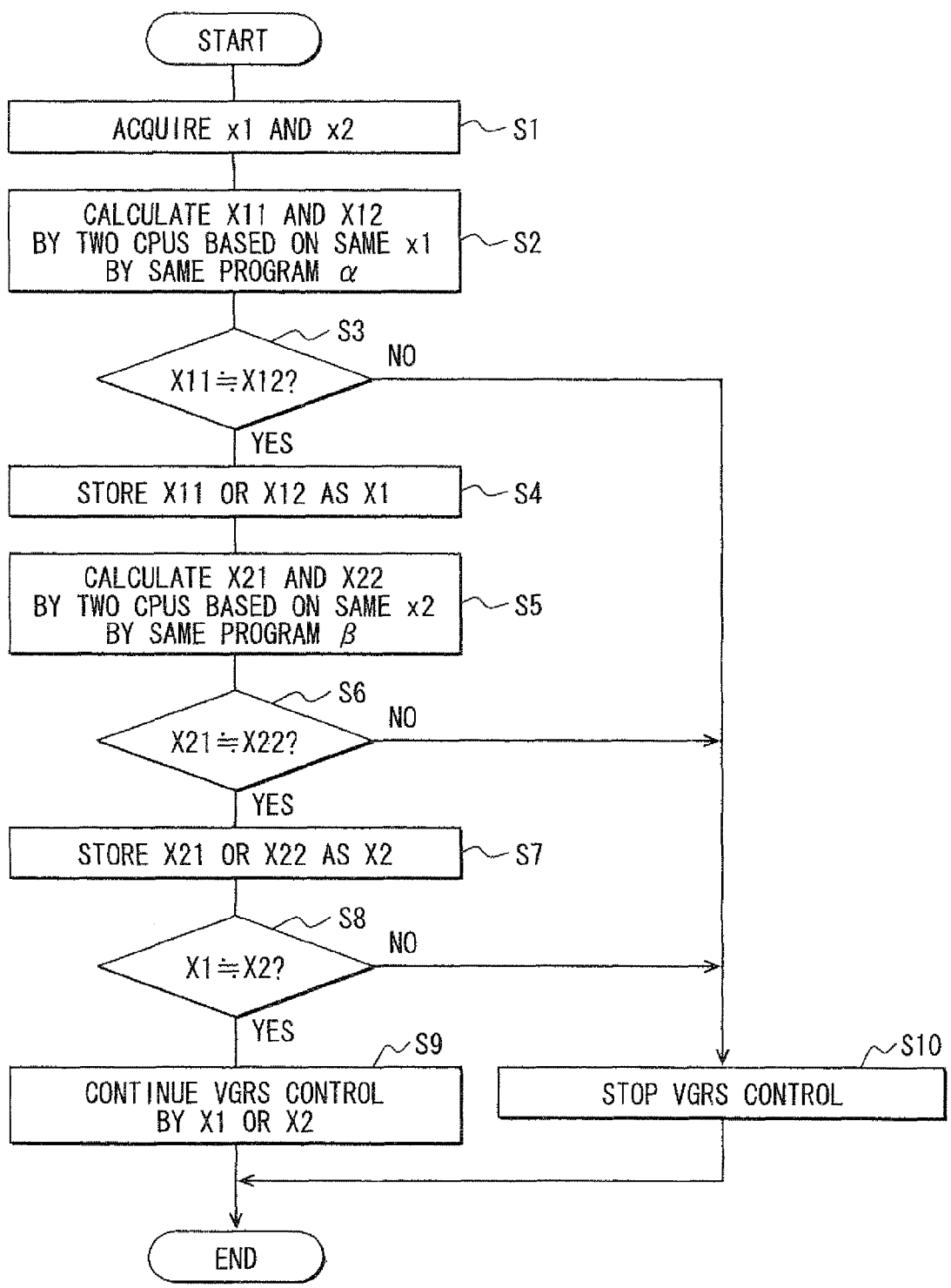
FIG. 8 is a flowchart showing the calculating operation of the detection values of the actuator operation angle performed in the embodiment.

Referring to FIG. 8, the VGRS-ECU 1 receives the detection signal from the rotation angle sensor 12 and acquires the first and second initial values x1 and x2 corresponding to the detection signal through the first and second input circuits 25 and 26 at S1. The VGRS-ECU 1, particularly the two CPUs 27 and 28, reads the first detection value calculation program α from the ROM 24 and executes the same first detection value calculation program α by using the same first initial value x1 to calculate the temporary first detection values X11 and X12, respectively, at S2.

The VGRS-ECU 1 compares the two first temporary detection values X11 and X12 by the comparator 30 at S3. If the first temporary detection values X11 and X12 have no significant difference or are equal to each other (S3: YES), either first temporary value X11 or X12 is stored as the first detection value X1 in the RAM 29 at S4. If the first temporary detection values X11 and X12 have a significant difference (S3: NO), the VGRS control is stopped and predetermined processing is performed at S1. This predetermined processing is provided for a case that the VGRS control cannot be continued.

Figure 9:
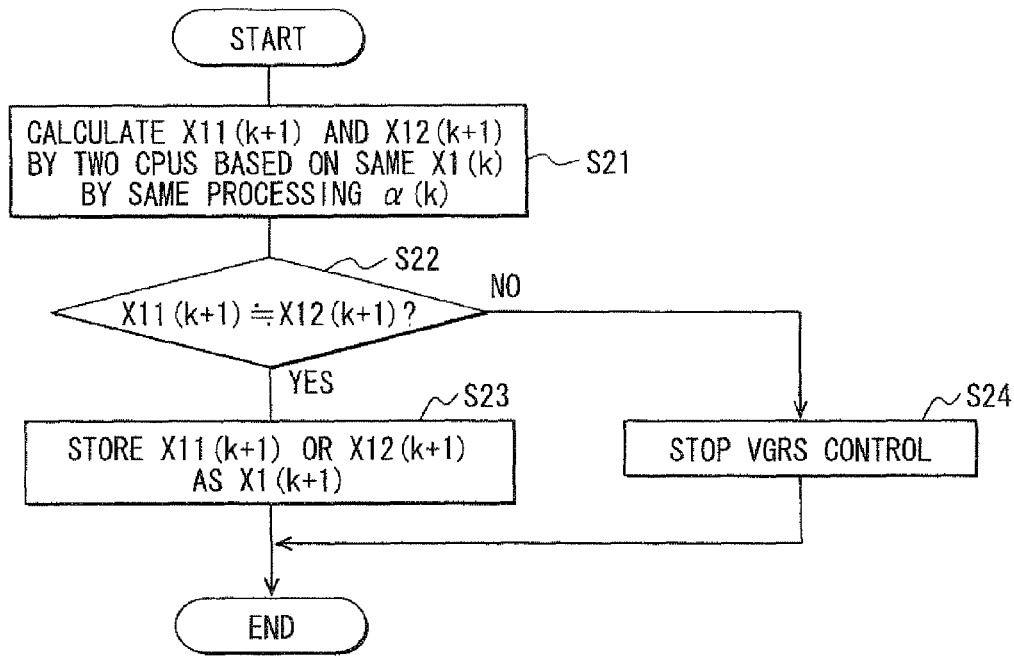
FIG. 9 is a flowchart showing the calculating operation of the first detection value performed in the embodiment.

In the execution of S2 to S4, the VGRS-ECU 1 repeats S21 to S23 shown in FIG. 9 thereby to calculate the first detection value X1 from the first initial value x1. That is, the VGRS-ECU 1, particularly the two CPUs 27 and 28, executes the processing α(k) by using the intermediate calculation value X1(k), and calculates the temporary intermediate calculation values X11(k+1) and X12(k+1) at S21.

The VGRS-ECU 1 compares the temporary intermediate calculation values X11(k+1) and X12(k+1) by the comparator 30 at S22. If these calculation values X11(k+1) and X12(k+1) have no significant difference or are equal to each other (522: YES), the VGRS-ECU 1 selects either temporary intermediate calculation value X11(k+1) or X12(k+1) as the intermediate calculation value X1(k+1) and stores it in the register 33 or 34 thereby updating the intermediate calculation value X1(k) to the intermediate calculation value X1(k+1) at S23.

If these calculation values X11(k+1) and X12(k+1) have a significant difference therebetween (S22: NO), the VGRS-ECU 1 stops the VGRS control and performs the predetermined processing at S24 because the VGRS control cannot be continued.

The VGRS-ECU 1, particularly the two CPUs 27 and 28, reads the second detection value calculation program β from the ROM 24 and executes the same second detection value calculation program β by using the same second initial value x2 to calculate the temporary second detection values X21 and X22, respectively, at S5.

The VGRS-ECU 1 compares the two second temporary detection values X21 and X22 by the comparator 30 at S6. If the second temporary detection values X21 and X22 have no significant difference or are equal to each other (S6: YES), either the second temporary value X21 or X22 is stored as the second detection value X2 in the RAM 29 at S7. If the second temporary detection values X11 and X12 have a significant difference (S6: NO), the VGRS control is stopped and the predetermined processing is performed at S10. This predetermined processing is provided for the case that the VGRS control cannot be continued.

Figure 10:
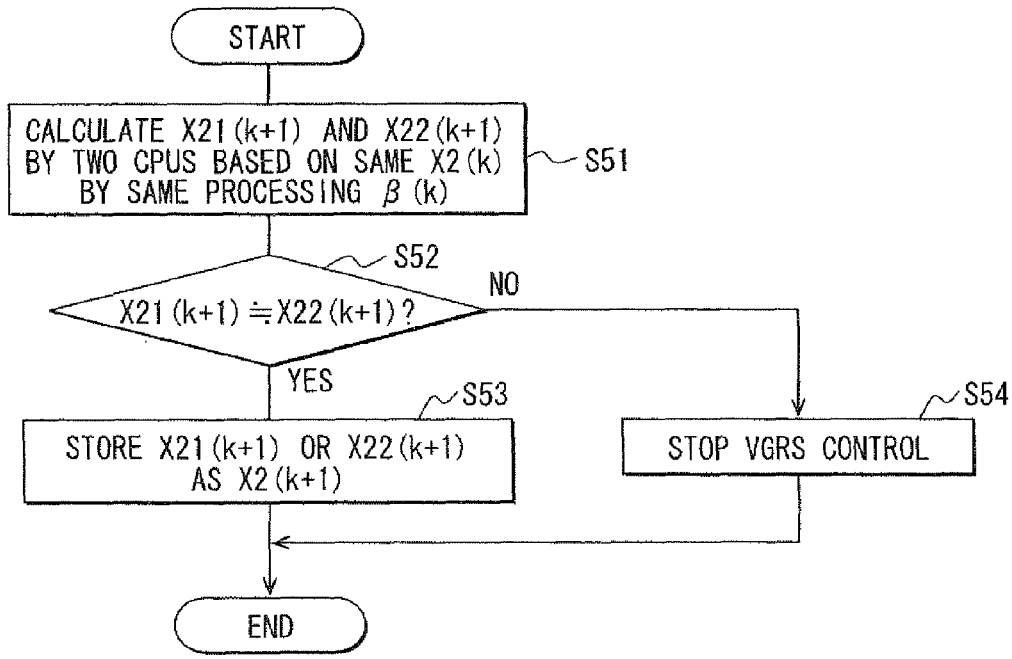
FIG. 10 is a flowchart showing the calculating operation of the second detection value performed in the embodiment.

In the execution of S5 to S7, the VGRS-ECU 1 repeats S51 to S53 shown in FIG. 10 thereby to calculate the second detection value X2 from the second initial value x2. That is, the VGRS-ECU 1, particularly the two CPUs 27 and 28, executes the processing β(k) by using the intermediate calculation value X2(k), and calculates the temporary intermediate calculation values X21(k+1) and X22(k+1) at S51.

The VGRS-ECU 1 compares the temporary intermediate calculation values X21(k+1) and X22(k+1) by the comparator 30 at S52. If these calculation values X21(k+1) and X22(k+1)

have no significant difference or are equal to each other (S52: YES), the VGRS-ECU 1 selects either temporary intermediate calculation value X21($k$+1) or X22($k$+1) as the intermediate calculation value X2($k$+1) and stores it in the register 33 or 34 thereby updating the intermediate calculation value X2($k$) to the intermediate calculation value X2($k$+1) at S53.

If these calculation values X21($k$+1) and X22($k$+1) have a significant difference therebetween (S52: NO), the VGRS-ECU 1 stops the VGRS control and performs the predetermined processing at S54 because the VGRS control cannot be continued.

The VGRS-ECU 1, particularly the two CPUs 27 and 28, reads the comparison program γ from the ROM 24 and executes the same comparison program γ by using the first and second detection values X1 and X2 to compare the first and second detection values X1 and X2, respectively, at S8.

If the first and second detection values X1 and X2 have no significant difference or are equal to each other (S8: YES), either detection value X1 or X2 is selected as the detection value of the actuator operation angle and continues the VGRS control by using the selected detection value as the actuator operation angle at S9. If the first and second detection values X1 and X2 have a significant difference (S8: NO), the VGRS control is stopped and the predetermined processing is performed at S10. This predetermined processing is provided for the case that the VGRS control cannot be continued.

Figure 11:
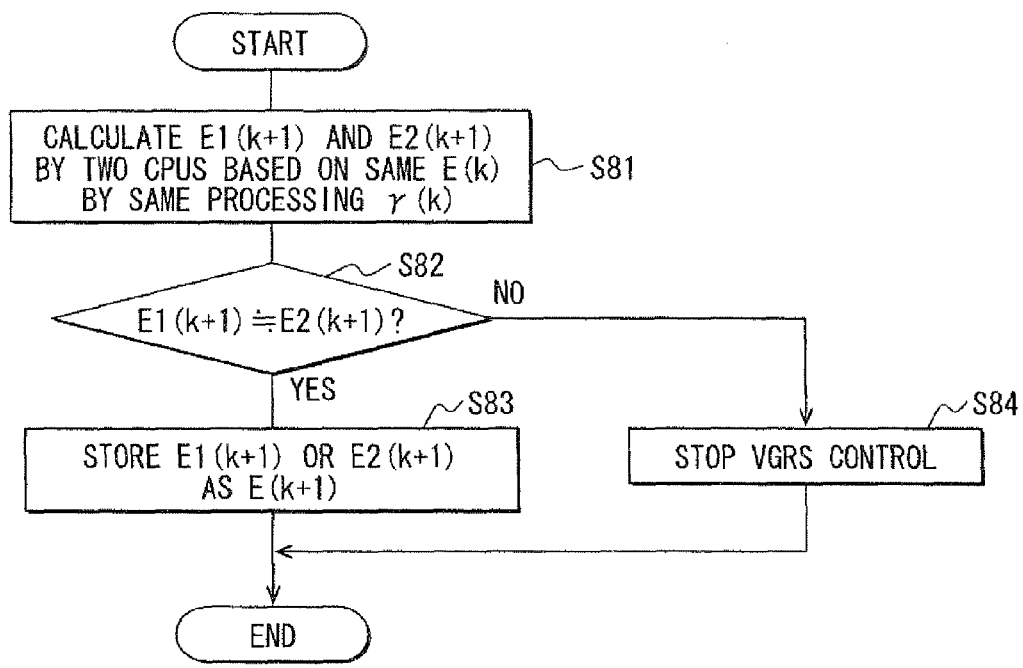
FIG. 11 is a flowchart showing the comparing operation performed in the embodiment.
Figure 12A:
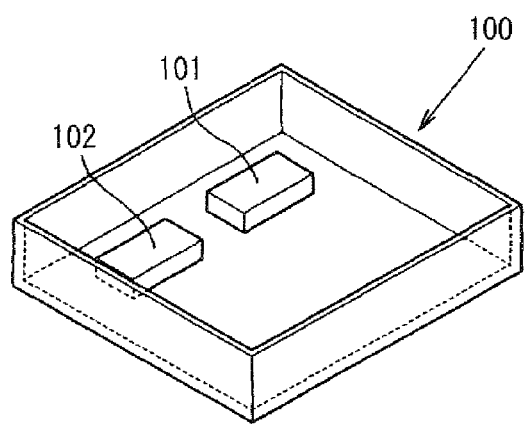
FIGS. 12A and 12B are a schematic view showing an VGRS-ECU for a VGRS and a block diagram of microcomputers according to a related art.
Figure 12B:
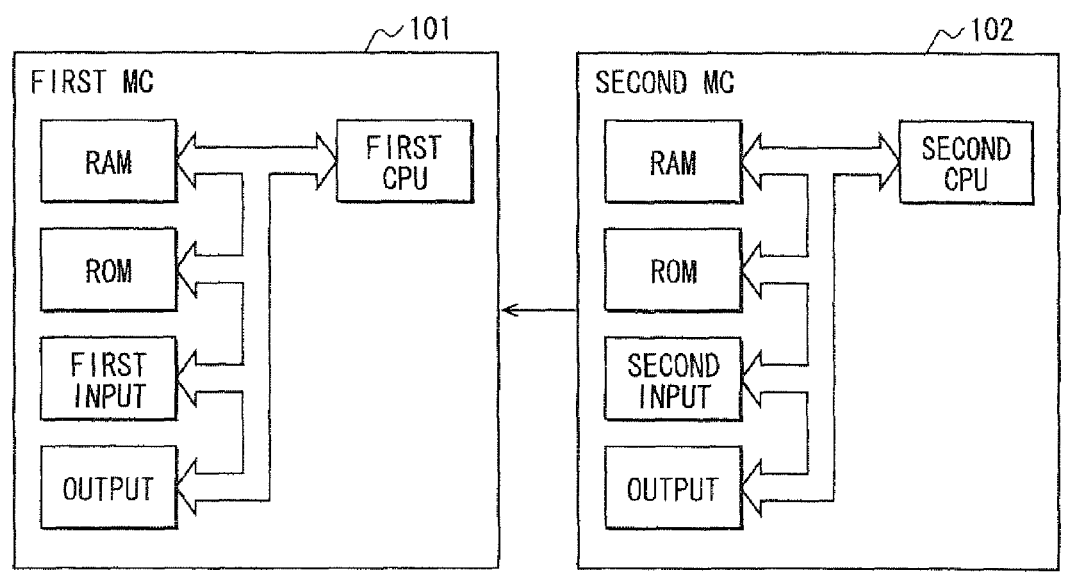
Figure 13:
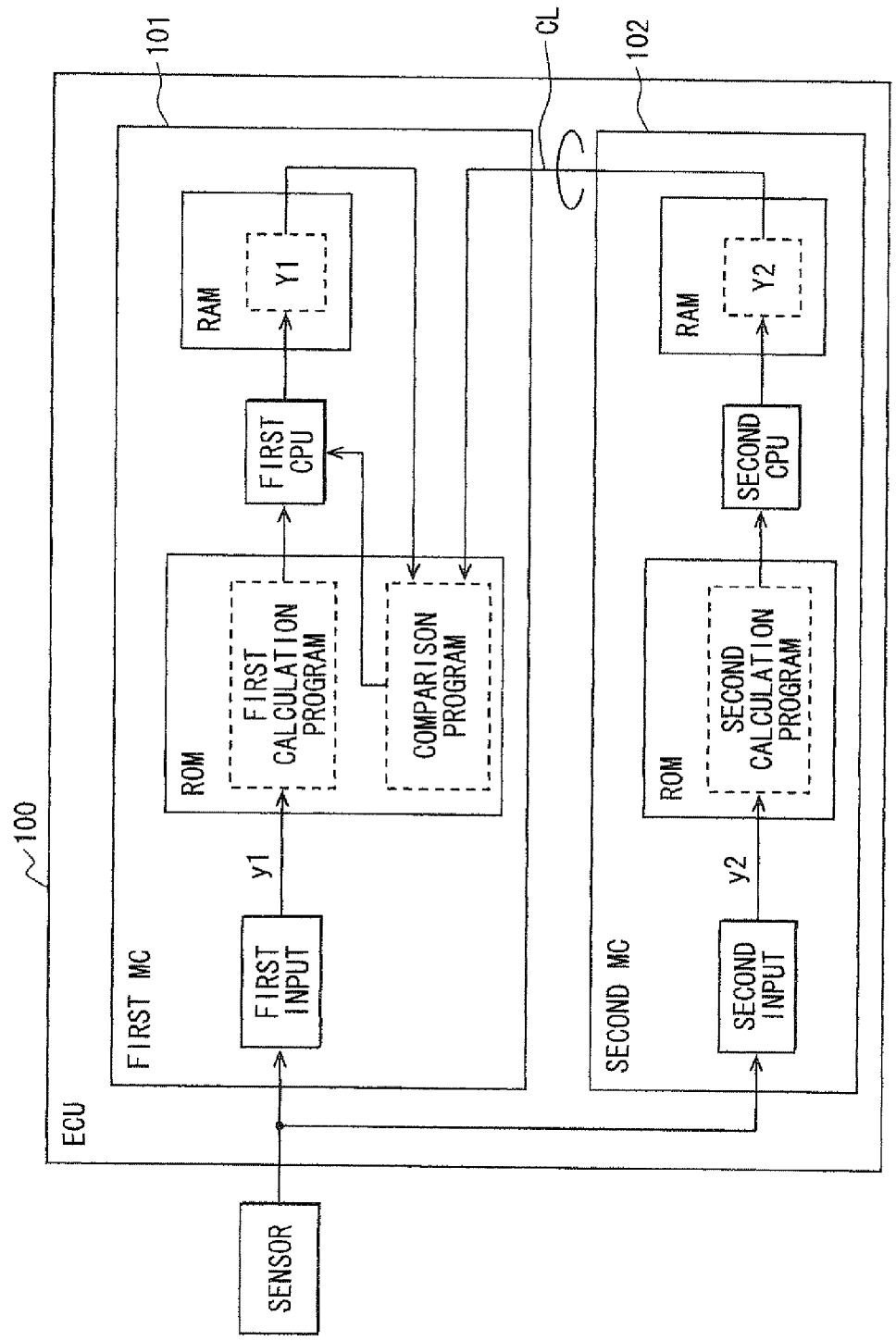
FIG. 13 is a block diagram showing a part of a microcomputer for calculation operation of detection values of an actuator operation angle according to the related art.
Figure 14:
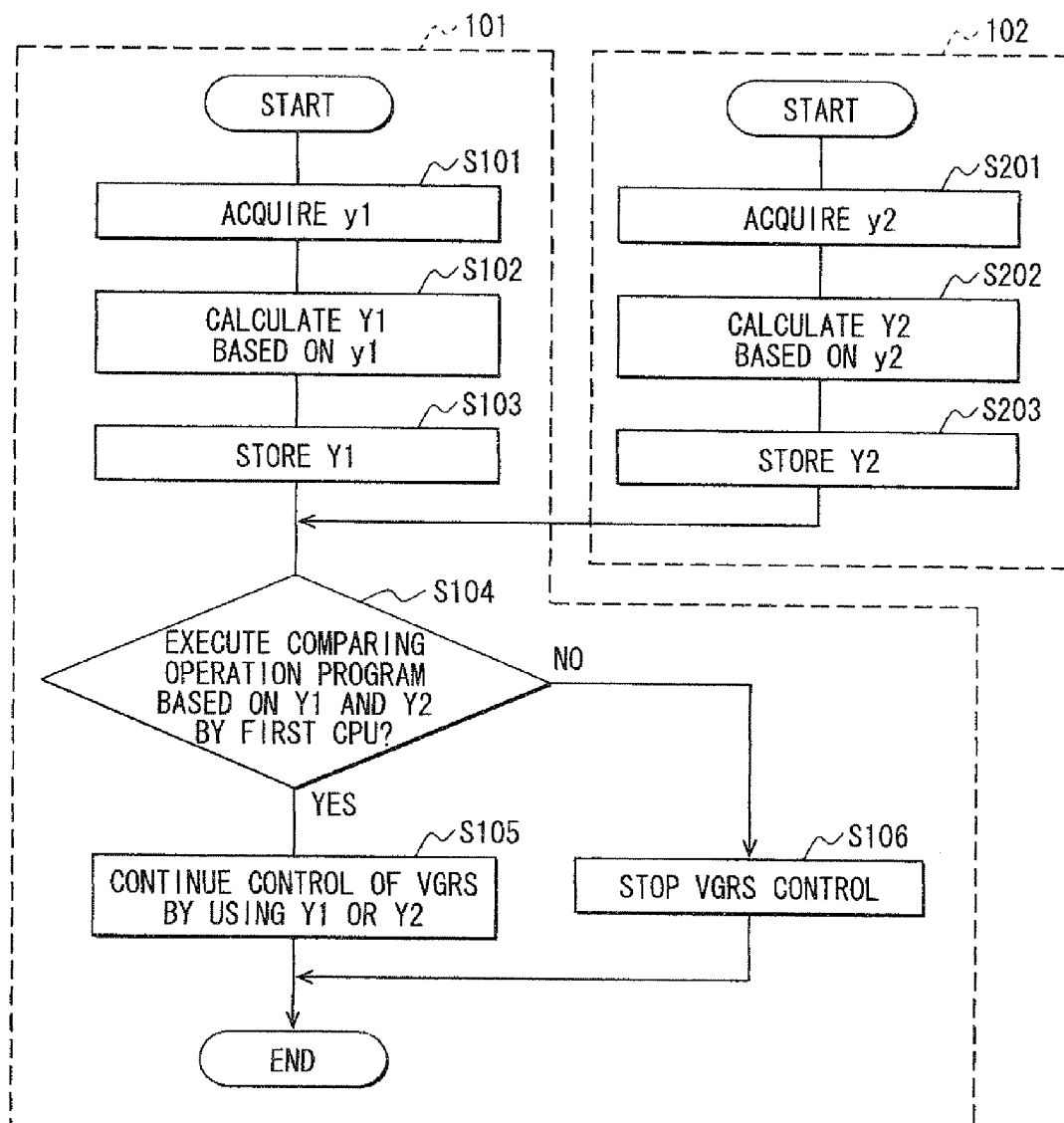
FIG. 14 is a flowchart showing the calculation operation of the detection values of the actuator operation angle performed according to the related art.

In the execution of S8, the VGRS-ECU 1 repeats S81 to S83 shown in FIG. 11. That is, the VGRS-ECU 1, particularly the two CPUs 27 and 28, executes the processing γ(k) by using the intermediate calculation value E2($k$), and calculates the temporary intermediate calculation values E1($k$+1) and E2($k$+1) at S81.

The VGRS-ECU 1 compares the temporary intermediate calculation values E1($k$+1) and E2($k$+1) by the comparator 30 at S82. If these calculation values E1($k$+1) and E2($k$+1) have no significant difference or are equal to each other (S82: YES), the VGRS-ECU 1 selects either temporary intermediate calculation value E1($k$+1) or E2($k$+1) as the intermediate calculation value E(k+1) and stores it in the register 33 or 34 thereby updating the intermediate calculation value E(k) to the intermediate calculation value E(k+1) at S83.

If these calculation values E1($k$+1) and E2($k$+1) have a significant difference therebetween (S82: NO), the VGRS-ECU 1 stops the VGRS control and performs the predetermined processing at S84 because the VGRS control cannot be continued.

The above embodiment provides the following advantages.

Since the VGRS-ECU 1 has only one microcomputer 22, which includes two (first and second) CPUs 27 and 28. Thus, various calculation results can be compared each other between the first and second CPUs 27 and 28.

Therefore, without providing two microcomputers in the VGRS-ECU 1, it is possible to monitor each other whether various processing are executed properly. The VGRS-ECU 1 can be reduced in size to be mounted in a limited space in a vehicle easily. Further, the reliability of detecting the actuator operation angle can be enhanced by the mutual monitoring of the processing results.

The microcomputer 22 receives the detection signal of the rotation angle sensor 12, which detects the actuator operation angle. The first and second CPUs 27 and 28 calculate the first and second detection values X1 and X2 to be compared each other.

If the comparison result indicates that the first and second detection values are in the predetermined relation, for instance, equal or different only slightly, one of the first and second detection values X1 and X2 is adopted as the detection value of the actuator operation angle. Thus, the reliability of detection signal produced by the rotation angle sensor 12 can be monitored. As a result, the reliability of the detection value of the actuator operation angle can be enhanced.

The ROM 24 of the microcomputer 22 stores the first and second detection value calculation programs α and β, which define the same calculation processing. The first and second CPUs 27 and 28 calculate the first detection values X1 by executing the same first detection value calculation program α, and further calculate the second detection values X2 by executing the same second detection value calculation program β.

The first and second detection values X1 and X2 thus calculated are compared to each other. If the first and second detection values are nearly equal to each other; one of the first and second detection values X1 and X2 is adopted as the detection value of the actuator operation angle. The first and second detection value calculation programs α and β can be monitored each other. If the first and second detection value calculation programs α and β are determined to be in the normal condition and proper, the reliability of the detection value of the actuator operation angle and hence the accuracy of VGRS control using such detection value of the actuator operation angle can be enhanced.

The first and second CPUs 27 and 28 calculate the temporary intermediate calculation values X11($k$+1) and X12($k$+1) by executing the processing α(k), which forms the first detection value calculation program α, by using the intermediate calculation value X1($k$), respectively. If the temporary intermediate calculation values X11($k$+1) and X12($k$+1) are nearly equal to each other, the first and second CPUs 27 and 28 adopt either one of the temporary intermediate calculation values X11($k$+1) and X12($k$+1) as the intermediate calculation value X1($k$+1) and use the adopted one in execution of the processing α(k+1).

Similarly, the first and second CPUs 27 and 28 calculate the temporary intermediate calculation values X21($k$+1) and X22($k$+1) by executing the processing β(k), which forms the first detection value calculation program β, by using the intermediate calculation value X2($k$), respectively. If the temporary intermediate calculation values X21($k$+1) and X22($k$+1) are nearly equal to each other, the first and second CPUs 27 and 28 adopt either one of the temporary intermediate calculation values X21($k$+1) and X22($k$+1) as the intermediate calculation value X2($k$+1) and use the adopted one in execution of the processing β(k+1).

Thus, it can be checked in the course of execution of the first and second detection value calculation programs α and β whether there is any abnormality after each processing of α(k) and β(k). For example, even if one of the first and second CPUs 27 and 28 fails to operate normally in the middle of calculation processing in the execution of the first and second detection value calculation programs α and β, such abnormality can be detected without fail. Thus, the execution process of the first and second detection value calculation programs α and β can be monitored consistently. As a result, the reliability of the detection value of the actuator operation angle can be enhanced.

The first and second CPUs 27 and 28 calculate the temporary intermediate calculation values E1($k$+1) and E2($k$+1), respectively, by executing the processing γ(k) of the comparison program γ, which uses the intermediate calculation value E(k). If the temporary intermediate calculation values E1($k$+1) and E2($k$+1) are nearly equal to each other, the first and second CPUs 27 and 28 adopts either one of the temporary intermediate calculation values E1($k$+1) and E2($k$+1) and uses the adopted one in the processing γ(k+1).

Thus, it can be checked in the course of execution of the comparison program γ whether there is any abnormality after each processing of γ(k). For example, even if one of the first and second CPUs 27 and 28 fails to operate normally in the middle of processing in the execution of the comparison program γ, such abnormality can be detected without fail. Thus, the execution process of the comparison program γ can be monitored consistently. As a result, the reliability of the detection value of the actuator operation angle can be enhanced.

The microcomputer 22 stores the first and second detection values X1 and X2 in its RAM 29. The stored first and second detection values X1 and X2 are compared in the execution of the comparison program γ. If the first and second detection values X1 and X2 are nearly equal to each other, either one of the first and second detection values X1 and X2 is used as the detection value of the actuator operation angle.

Thus, it is possible to check whether there is any abnormality in the storage areas of the first and second detection values X1 and X2 in the RAM 29. As it is thus assured that the RAM 29 has no abnormality in its storage areas for the first and second detection values X1 and X2, the reliability of the detection value of the actuator operation angle can be enhanced.

The microcomputer 22 includes the first and second input circuits 25 and 26 for receiving the detection signal from the rotation angle sensor 12. In executing the first detection value calculation programs α and β, the first and second CPUs 27 and 28 use the first initial value x1 produced from the first input circuit 25 and the second initial value x2 produced from the second input circuit 26, respectively.

The first detection value calculated based on the first initial value x1 and the second detection value X2 calculated based on the second initial value x2 are compared each other in execution of the comparison program γ. If the comparison result indicates that the first detection value X1 and the second detection value X2 are nearly equal to each other, either one of the first and second detection values X1 and X2 is used as the detection value of the actuator operation angle. Thus, it can be monitored whether any one of the first and second input circuits 25 and 26 fails to operate normally. As it is thus assured that the first and second input circuits 25 and 26 have no abnormality, the reliability of the detection value of the actuator operation angle can be enhanced.

The VGRS-ECU 1 according to the above embodiment may be modified such that the microcomputer 22 has two ROMs, which store the first and second detection value calculation programs α and β, respectively.

Similarly, the microcomputer 22 may have two RAMs, which store the first and second detection values X1 and X2, respectively.

The first and second input circuits 25 and 26, the first and second CPUs 27 and 28, and the first and second detection value calculation programs α and β may be not only identical but may be in a predetermined relation to each other, as long as the normality of such circuits and programs can be confirmed as maintained in the normal condition based on the comparison of the two outputs.

The above embodiment may be applied to other control systems in a vehicle.

What is claimed is:

1. A VGRS electronic control apparatus, which receives an input of an electric signal from a sensor indicating an operation amount of an actuator of a variable gear ratio steering device that varies a ratio of transfer between a steering angle of a steering wheel and a steered angle of steered wheels, calculates a detection value of the operation amount based on the electric signal and controls the variable gear ratio steering device in accordance with the detected value, the VGRS electronic control apparatus comprising:
    a microcomputer mounted on a substrate with other electronic circuit elements,
    wherein the microcomputer includes two CPUs, each of which calculates the detection value based on the detection value, a ROM, which stores two detection value calculation programs having same processing contents for calculating the detection value, and a comparator, which compares processing results of the two CPUs,
    wherein the two CPUs calculate the detection value by using one of the two detection value calculation programs and the detection value by using the other of the two detection value calculation programs, respectively,
    wherein a first detection value and a second detection value are compared, the first detection value and the second detection value being the detection values produced by executing the one and the other of the two detection value calculation programs,
    wherein the two CPUs calculate intermediate values by executing a plurality of processing, which form the one of the detection value calculation program, in executing the one of the detection value calculation program, and intermediate values by executing a plurality of processing, which form the other of the detection value calculation program, in executing the other of the detection value calculation program, respectively, and
    wherein the comparator compares the intermediate values of the one of the two CPUs and the other of the two CPUs, each time the two CPUs calculate the intermediate values by executing the one of the detection value calculation programs and the other of the detection value calculation programs, respectively.

2. The VGRS electronic control apparatus according to claim 1, wherein:
    the ROM stores a comparison program defining processing of comparison of the first detection value and the second detection value; and
    the two CPUs compare the first detection value and the second detection value by execution of the comparison program.

3. The VGRS electronic control apparatus according to claim 2, wherein:
    the two CPUs calculate the intermediate values by a plurality of processing of the comparison programs in executing the comparison programs, respectively; and
    the comparator compares the intermediate value calculated by one of the two CPUs and the intermediate value calculated by the other of the two CPUs, each time the two CPUs calculate the intermediate values, respectively, by executing the comparison program.

4. The VGRS electronic control apparatus according to claim 1, wherein:
    the microcomputer has a RAM for storing the first detection value and the second detection value.

5. The VGRS electronic control apparatus according to claim 1, wherein:
    the microcomputer includes two input circuits for receiving the electric signal of the sensor;
    the two CPUs use an initial value of one of the two input circuits and an initial value of the other of the two input circuit in executing the one of the detection value calculation programs and the other of the detection value calculation programs, respectively.

6. The VGRS electronic control apparatus according to claim 2, wherein:

the microcomputer has a RAM for storing the first detection value and the second detection value.

7. The VGRS electronic control apparatus according to claim 2, wherein:
the microcomputer includes two input circuits for receiving the electric signal of the sensor;
the two CPUs use an initial value of one of the two input circuits and an initial value of the other of the two input circuit in executing the one of the detection value calculation programs and the other of the detection value calculation programs, respectively.

8. The VGRS electronic control apparatus according to claim 3, wherein:
the microcomputer has a RAM for storing the first detection value and the second detection value.

9. The VGRS electronic control apparatus according to claim 3, wherein:
the microcomputer includes two input circuits for receiving the electric signal of the sensor;
the two CPUs use an initial value of one of the two input circuits and an initial value of the other of the two input circuit in executing the one of the detection value calculation programs and the other of the detection value calculation programs, respectively.

10. The VGRS electronic control apparatus according to claim 4, wherein:
the microcomputer includes two input circuits for receiving the electric signal of the sensor;
the two CPUs use an initial value of one of the two input circuits and an initial value of the other of the two input circuit in executing the one of the detection value calculation programs and the other of the detection value calculation programs, respectively.

* * * * *